(12) United States Patent
Shin

(10) Patent No.: US 9,158,017 B2
(45) Date of Patent: Oct. 13, 2015

(54) SEISMIC IMAGING APPARATUS UTILIZING MACRO-VELOCITY MODEL AND METHOD FOR THE SAME

(75) Inventor: Changsoo Shin, Seoul (KR)

(73) Assignee: Seoul National University R&DB Foundation, Seoul (KR)

( * ) Notice: Subject to any disclaimer, the term of this patent is extended or adjusted under 35 U.S.C. 154(b) by 811 days.

(21) Appl. No.: 13/425,566

(22) Filed: Mar. 21, 2012

(65) Prior Publication Data

US 2012/0243373 A1 Sep. 27, 2012

Related U.S. Application Data

(60) Provisional application No. 61/466,333, filed on Mar. 22, 2011.

(30) Foreign Application Priority Data

Mar. 21, 2012 (KR) .................. 10-2012-0029031

(51) Int. Cl.
*G01V 1/28* (2006.01)

(52) U.S. Cl.
CPC .......... *G01V 1/282* (2013.01); *G01V 2210/614* (2013.01); *G01V 2210/622* (2013.01)

(58) Field of Classification Search
CPC ............ G01V 1/282; G01V 2210/614; G01V 2210/622
See application file for complete search history.

(56) References Cited

U.S. PATENT DOCUMENTS

| | | | |
|---|---|---|---|
| 4,982,382 A * | 1/1991 | Dablain | 367/73 |
| 5,394,325 A * | 2/1995 | Schneider, Jr. | 702/18 |
| 6,253,157 B1 * | 6/2001 | Krebs | 702/18 |
| 6,611,764 B2 * | 8/2003 | Zhang | 702/18 |
| 6,675,097 B2 | 1/2004 | Routh et al. | |
| 7,768,870 B2 * | 8/2010 | Broto et al. | 367/25 |
| 8,094,513 B2 * | 1/2012 | Keers et al. | 367/19 |

(Continued)

FOREIGN PATENT DOCUMENTS

| | | |
|---|---|---|
| KR | 10-2010-0029214 A | 3/2010 |
| KR | 10-2010-0135602 A | 12/2010 |
| WO | WO 03/023447 A2 | 3/2003 |

OTHER PUBLICATIONS

Luo, Y. and G.T. Schuster. "Wave-equation traveltime inversion." Geophysics. vol. 56, No. 5 (May 1991);pp. 645-653.

(Continued)

*Primary Examiner* — Ari M Diacou
(74) *Attorney, Agent, or Firm* — NSIP Law

(57) ABSTRACT

There is provided a seismic imaging technology for imaging a subsurface structure by processing measured data reflected from the subsurface structure after a wave from a source wave has been propagated to the subsurface structure. According to an aspect, there is provided a seismic imaging method for obtaining imaging data of a subsurface structure through waveform inversion using a macro-velocity model as an initial value, wherein the macro-velocity model which is used as the initial value for the waveform inversion is calculated by: calculating a velocity difference function which is a difference between a real velocity and an initial velocity model, wherein the velocity difference function is a ratio of measured seismic scattered energy and modeled scattered energy based on the initial velocity model; and calculating the macro-velocity model by updating the initial velocity model with the velocity difference function.

4 Claims, 7 Drawing Sheets

(56) References Cited

U.S. PATENT DOCUMENTS

| | | |
|---|---|---|
| 2009/0006000 A1 | 1/2009 | Shin |
| 2009/0303834 A1* | 12/2009 | Sengupta et al. ............ 367/73 |
| 2010/0322032 A1 | 12/2010 | Shin |
| 2011/0267921 A1* | 11/2011 | Mortel et al. ............ 367/25 |
| 2013/0185040 A1* | 7/2013 | Starr et al. ............ 703/6 |

OTHER PUBLICATIONS

Shin, Changsoo and Young Ho Cha. "Waveform inversion in the Laplace domain." Geophysical Journal International. vol. 173 (Feb. 2008), pp. 922-931.

* cited by examiner

SEISMIC IMAGING APPARATUS UTILIZING MACRO-VELOCITY MODEL AND METHOD FOR THE SAME

CROSS-REFERENCE TO RELATED APPLICATION

This application claims the benefit under 35 U.S.C. §119 (a) of a U.S. Patent Application No. 61/466,333, filed on Mar. 22, 2011, and a Korean Patent Application No. 10-2012-0029031, filed on Mar. 21, 2012, the entire disclosures of which are incorporated herein by reference for all purposes.

BACKGROUND

1. Field

The following description relates to a seismic imaging technology for imaging a subsurface structure by processing measured data reflected from the subsurface structure after a wave from a source wave has been propagated to the subsurface structure.

2. Description of the Related Art

Geophysicists study subsurface structures using information recorded at the surface in various ways, one of which is a full waveform inversion. However, recovering an accurate velocity model from field data or even synthetic data can be difficult due to local minima in the objective functions and the absence of low-frequency components in the data. These difficulties lead to the use of a two-step inversion process. In the first step, a largescale velocity model is recovered, and in the second step, inversion is performed to improve the resolution of the velocity model. There are several methods that can be used to obtain a reliable macro-velocity model, such as traveltime tomography disclosed in "Luo, Y. and Schuster, G. T. 1991. Wave-equation traveltime inversion. Geophysics 56, 645-653", and inversion algorithms in the Laplace domain disclosed in "Shin, C. and Cha, Y. H.2008. Waveform inversion in the Laplace domain. Geophysical Journal International 173, 922-931. 2008." Traveltime tomography reconstructs the subsurface velocity model by minimizing the residuals between the modeled and observed traveltimes. However, its penetration depth can be prohibitively shallow, and the method relies on the arrival times chosen. The macro-velocity model can also be estimated by an inversion in the Laplace domain. The Laplace-domain inversion scheme has been shown to be successful in recovering reliable macro-velocity models from field data containing a small amount of low-frequency components. However, the Laplace-domain inversion suffers from noise appearing before the first arrival. Muting is therefore mandatory in Laplace-domain inversion.

SUMMARY

The following description relates to a technique of reducing the amount of computation upon waveform inversion and providing a subsurface structure image with enhanced resolution.

The following description also relates to a technique of improving the characteristics of low-frequency bands and enhancing the resolution of deep region in the reconstructed image.

The following description also relates to a technique of improving an initial velocity model upon waveform inversion to increase the convergence speed of iteration loop.

According to an aspect of the present invention, there is provided a new method to recover macro- or ultra macro-velocity models of the subsurface. An aspect of the present invention relies on an idea that the reflected waves from high-velocity structures have large amplitudes. Thus, we surmise that the energy computed from recorded data can be used to reveal high-velocity structures in the subsurface. Furthermore, we assume that the energy of the observed seismogram is similar to a gravity anomaly in gravity inversion. Gravity anomalies from each subsurface structure are similar to the energy of perturbed signals from each scatterer.

According to another aspect of the present invention, wavefield data is converted to energy data to recover high-velocity anomalies. We assume that the wavefield data is the sum of scattered signals by point scatterers in the subsurface following the Born theory (Lkelle, L. T. and Amundsen, L. 2005. Introduction to Petroleum Seismology. Society of exploration Geophysics. ISBN 1560801298), and we build a system of equations by relating the energy of the observed data to that of the scattered signals.

Other features and aspects will be apparent from the following detailed description, the drawings, and the claims.

Figure 1:
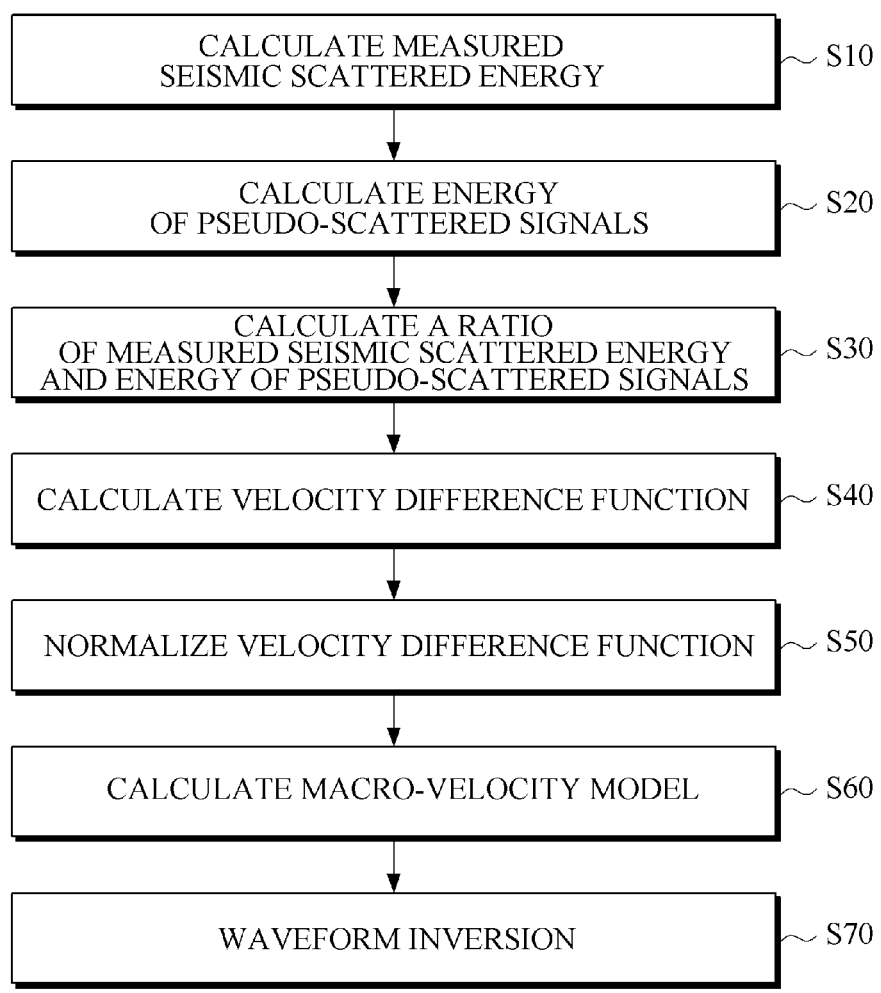
FIG. 1 is a schematic flow diagram illustrating an example of a seismic imaging method.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

FIG. 1 is a schematic flow diagram illustrating an example of a seismic imaging method for obtaining imaging data of a subsurface structure through waveform inversion using a macro-velocity model as an initial value. The macro-velocity model is used as an initial value for the waveform inversion. As shown in FIG. 1, the macro-velocity model is calculated by calculating a velocity difference function (S40) which is a difference between a real velocity and an initial velocity model, wherein the velocity difference function is a ratio of measured seismic scattered energy and modeled scattered energy based on the initial velocity model, and calculating the macro-velocity model by updating the initial velocity model with the velocity difference function (S60).

First, an energy of a signal x(t) is defined as the zero-lag autocorrelation, following definitions proposed by Mitra in "Mitra, S. K. 2005. Digital signal processing: A computer-based approach. McGraw-Hill College. ISBN 0073048372".

$$E = \int_0^{t_{max}} u^2(t) dt \tag{1}$$

According to the Lippmann-Schwinger integral solution disclosed in Lkelle and Amundsen, 2005 referred above, actual medium can be decomposed into two parts. One part is the background velocity model, and the other is the perturbed model, which is the scattered model. The waves propagating directly from a source to a receiver are called the direct waves or unperturbed waves, and the waves that propagate through scatterers are known as scattered waves or perturbed waves. For a model containing point scatterers, the Lippmann-Schwinger equation is used to separate the wavefield data as $$u(t) = u_i(t) + u_p(t) \tag{2}$$

where u(t) is the acquired wavefield using a source-receiver pair, $u_i(t)$ is the unperturbed components of the wavefield u(t), and $u_p(t)$ is the wavefield components containing the scattered signals.

The scattering can occur at any point in the subsurface, and $u_p(t)$ is approximated by the total sum of the single-point scattered wave signals using the concept of the Born approximation. Thus, $u_p(t)$ can be described as $$u_p(t) \approx \int_\Omega s(x, t) d\Omega \tag{3}$$

where s(x, t) is the 1st-order point-scattered signal, and x is the position of a scatterer in the subsurface domain $\Omega$. According to an aspect, it is assumed that $u_i(t)$ contains signals appearing prior to the seafloor reflection, such as a head wave as well as a direct arrival, and does not have the scattered signals from beneath the seafloor. Thus, it can be removed from the data sets.

Here, s(x,t) has significant computational burden and accordingly its approximate value is used.

Figure 3A:
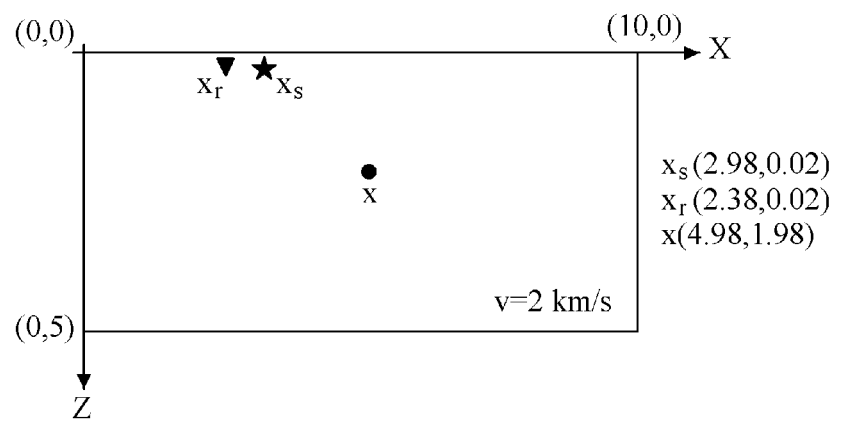
FIGS. 3A and 3B are graphs plotting $\Delta v$ values of three different functions of velocity perturbation of different point scatterers.
Figure 3B:
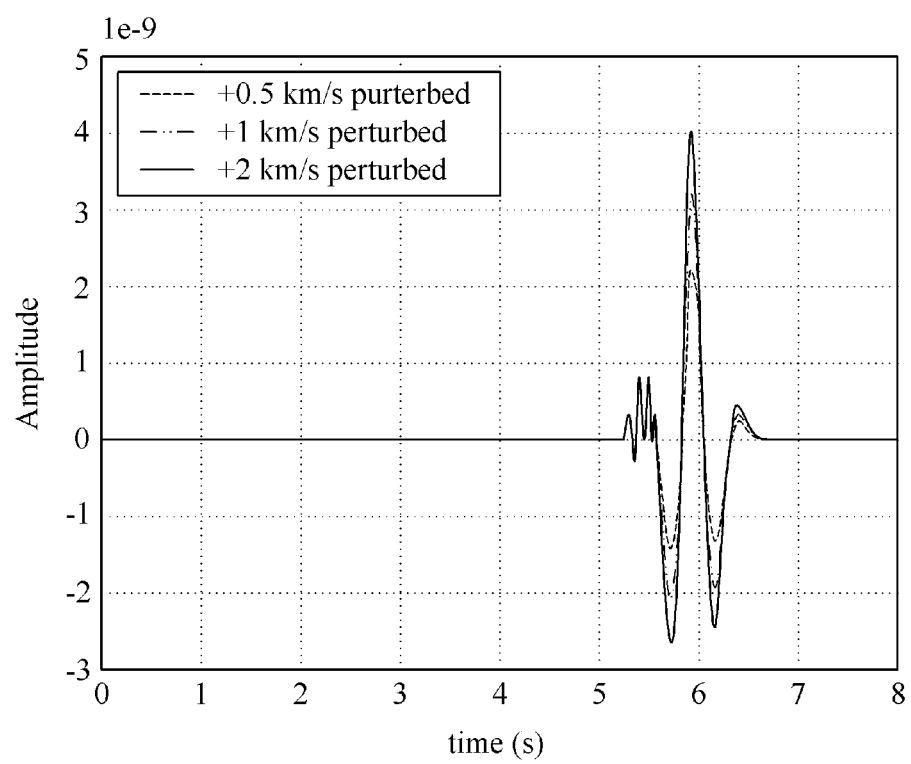

To define an appropriate approximated function, the sensitivity of the amplitude of the wavefield is empirically investigated to a velocity perturbation using a point scatterer. FIGS. 3A and 3B show a signal obtained using a 4th order finite difference algorithm as a function of velocity perturbation, $\Delta v$. The magnitude of the velocity perturbation does not affect the shape of the scattered signal, only its amplitude is affected as shown in FIG. 3B. FIG. 3A shows the value of the peak amplitude of the scattered wavefield as a function of the velocity perturbation, $\Delta v$, for five scatterers with different source and receiver positions. Then, each data set is normalized to remove the effect of geometrical spreading, which is shown in FIG. 3B. The resulting peak amplitude, $R[\Delta v]$, is only a function of $\Delta v$. From these simple two analyses, it is concluded that the amplitude variation of a single point-scattered signal can be decoupled into geometric spreading and a velocity perturbation component, where the effect of geometrical spreading can be calculated analytically according to a method disclosed in "Kuvshinov, B. N. and Mulder, W. A. 2006. The exact solution of the time-harmonic wave equation for a linear velocity profile. Geophysical Journal International 167, 659-662."

This observation is used to express $\hat{s}(x, t)$ as $$\hat{s}(x,t) = A_0 \lambda(x;x_s) \lambda(x;x_r) R[\Delta v(x)] \delta(t-t_x) \; t_x = T(x,x_s) + T(x,x_r) \tag{4}$$

where x, $x_s$, and $x_r$ are the positions of a point scatterer, source, and receiver, respectively. $\lambda(x_b;x_a)$ is the ratio of the amplitude decay during wave propagation from $x_a$ to $x_b$ due to geometrical spreading, and $\Delta v(x)$ is the difference between the true velocity and the background velocity model at scattering position x. $R[\Delta v(x)]$ is a function relating the energy scattering ratio and the velocity difference. $\lambda(x_b;x_a)$ is calculated by the analytic solution, which will be defined later. $\delta(t-t_x)$ is a delta function. $T(x,x_s)$ and $T(x,x_r)$ are the traveltimes of the scattered signal from point x to source $x_s$ and receiver $x_r$, respectively. $A_0$ is the initial amplitude of the source.

However, the delta-function signal approximation is not appropriate to express the energy of the scattered signal. It can be easily determined that even if the amplitude of the delta function is identical to the perturbed signal's maximum amplitude, the energy of the scattered signal in equation 1 cannot be described by the delta function assumption. Therefore, the approximation of the 1st-order point-scattered signal is changed from the delta function to the box-shape signal and rewritten as equation (4) below $$\bar{s}(X,t) A_0 \lambda(x;x_s) \lambda(x;x_r) R[\Delta v(x)], \; (t_x - \epsilon \leq t \leq t_x + \epsilon) \tag{5}$$

The signal is in the interval between $t_x - \epsilon$ and $t_x + \epsilon$ only. Whenever the appropriate value of $\epsilon$ is found, $\hat{s}(x,t)$ can be assumed to have the same energy as $\hat{s}(x,t)$ for a single point-scattered signal.

Equation (3) is redefined using the pseudo 1st-order point-scattered signal $\hat{s}(x,t)$ as $$u_s(t) \approx \int_\Omega \bar{s}(x, t) d\Omega \tag{6}$$

Figure 5:
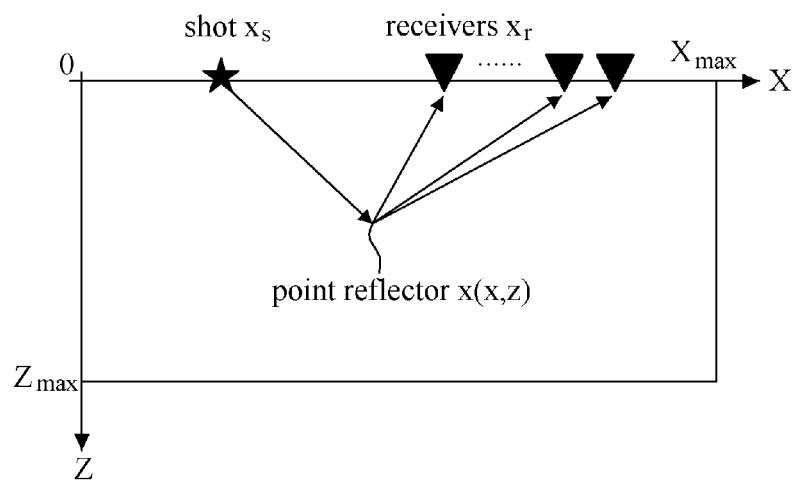
FIG. 5 shows the propagation of a single point-scattered signal

FIG. 5 shows the propagation of a single point-scattered signal. During propagation, the amplitude of the signal decreases proportionally to the distance travelled. A linearly increasing velocity model is selected as the background and calculated $\lambda$ using the amplitude of the analytic solution according to the method disclosed in the Kuvshinov and Mulder, 2006. Additionally, the solution is not a halfspace solution, but it is used as an approximation. The analytic solution can be expressed as $$\text{Amplitude} = \lambda(x_b; x_a) = \frac{1}{\sqrt{4 v v_0 \alpha^{-2}(\tilde{u}^2 - 1)}} \tag{7}$$

Where, $$\tilde{u} = 1 + \frac{r^2}{2\hat{z}_0 \hat{z}},$$

$$\alpha = (v_{max} - v_0) z_{max},$$

$$\hat{z} = z + v_0/\alpha,$$

$$\hat{z}_0 = z_s + v_0/\alpha$$

$$r = \sqrt{(x-x_s)^2 + (z-z_s)^2} \tag{8}$$

where $v_0$ denotes the velocity at the surface, $z_{max}$ is the maximum depth, $v_{max}$ is the velocity at the bottom of the linearly increasing velocity model, $x_a$ ($x_s$, $z_s$) and $x_b$(x, z) are the position vectors of the source and receiver, respectively, and r is the distance between the source and receiver.

Equation (6) shows that $u_p(t)$ can be approximated with the total sum of single-scattered wavefields. By the definition of the pseudo 1st-order point-scattered signal and the definition of energy in equation (1), the equilibrium equations of the scattering energy at each source and receiver can be derived.

$$\int_0^{t_{max}} \left( \int_\Omega \bar{s}(x,t) d\Omega \right)^2 dt = e^{s,r} \quad (9)$$

where $e^{s,r}$ is the energy of the signal recorded at r with source s. However, it is difficult to compute the system matrix equation of equation (9), and the exact traveltime is required. To overcome this problem, we assume that the total energy can be approximated by the sum of the energy of each scattered signal. The interference among each scattering signal must not influence the energy distribution of the data to satisfy this assumption. A sparse parameterization and the high-frequency approximation are used, which was shown as a box-shaped signal with a short duration, to minimize the interference among the scattered signals. Then, equation (9) can be rewritten as equation (10):

$$\int_\Omega \int_0^{t_{max}} \{\bar{s}(x,t)\}^2 dt d\Omega = e^{s,r} \quad (10)$$

According to an aspect of the present invention, calculation of the velocity difference function includes approximating measured seismic signals to a sum of scattered waves to calculate the measured seismic scattered energy (step S10 in FIG. 1). That is, on the right-hand side of equation (10), the energy is calculated at each receiver position with respect to a shot, which can be calculated from observed wavefield data as $$e^{s,r} = \int_0^{t_{max}} \{u_p^{s,r}(t)\}^2 dt \quad (11)$$

The notation $u_p(t)$ is changed to $u_p^{s,r}(t)$ with respect to each source and receiver. Then, $n_r \times n_s$ scattering energy data can be computed. The left-hand side of equation (10) is derived as follows. First, scattering energy is considered. The energy from a scattering signal is expressed using the definition of energy as $$\int_0^{t_{max}} \{\bar{s}(x,t)\}^2 dt = \int_{t_x-\varepsilon}^{t_x+\varepsilon} \{A_0 \lambda(x;x_s)\lambda(x;x_r)R[\Delta v(x)]\}^2 dt \quad (12)$$
$$= 2\varepsilon A_0^2 \{\lambda(x;x_s)\lambda(x;x_r)R[\Delta v(x)]\}^2$$

where time $t_x$ is located at the center of the box signal. It is assumed that the amplitude depends on both the distance travelled and $R[\Delta v(x)]$ from equation (4). The sum of the scattering energy can be expressed as $$\int_\Omega \int_0^{t_{max}} \{\bar{s}(x,t)\}^2 dt d\Omega = \int_\Omega 2\varepsilon A_0^2 \{\lambda(x;x_s)\lambda(x;x_r)R[\Delta v(x)]\}^2 d\Omega \quad (13)$$
$$= 2\varepsilon A_0^2 \int_\Omega \{\lambda(x;x_s)\lambda(x;x_r)R[\Delta v(x)]\}^2 d\Omega$$

Finally, the equilibrium equation of the scattering energy is built as follows, $$2\varepsilon A_0^2 \int_\Omega \{\lambda(x;x_s)\lambda(x;x_r)R[\Delta v(x)]\}^2 d\Omega = e^{s,r} \quad (14)$$

If equation (14) is divided by $2\varepsilon A_0^2$, then an interesting characteristic is found:

$$\int_\Omega \{\lambda(x;x_s)\lambda(x;x_r)R[\Delta v(x)]\}^2 d\Omega = e^{s,r}/2\varepsilon A_0^2 \quad (15)$$

Here, adequate selection of $\varepsilon$ is important for the validity of our box signal assumption. The value of $\varepsilon$ depends on the source signature. If the source signature is invariable for every shot, the value of $\varepsilon$ becomes a constant. Therefore, we can ignore $\varepsilon$ in this algorithm, which determines the relative ratio of the velocity difference.

According to an aspect of the present invention, calculation of the velocity difference function includes calculating energy of pseudo-scattered signals from a simple velocity model (step S20 in FIG. 1) and calculating a relative velocity anomalies ratio which is a ratio of a value of the measured seismic scattered energy and a value of the energy of pseudo-scattered signals (step S30 in FIG. 1). That is, expressing a system of equation (15) as follows:

$$Kr = e \quad (16)$$

where K is an $(n_s \times n_r) \times (n_x \times n_z)$ matrix, r is a vector with $(n_x \times n_z)$ elements, e is a vector with $(n_s \times n_r)$ elements, and $n_s$ and $n_r$ are the numbers of sources and receivers, respectively. The system can be solved using the normal equation as follows:

$$Kr = e \quad (17)$$
$$\Rightarrow K^T K r = K^T \bar{e}$$
$$\Rightarrow \text{diag}[K^T K] r = K^T \bar{e}$$
$$\Rightarrow r = \frac{K^T \bar{e}}{\text{diag}[K^T K]}.$$

r is calculated using diagonal components only because of the limitation of computational resources. By only using diagonal components, our algorithm becomes extremely fast and inexpensive. Then, the anomaly r, which is a relative ratio, can be computed, and it can be shown where the velocity anomaly is located. However, a negative value of r cannot be obtained because only the diagonal of the matrix is used.

Figure 4A:
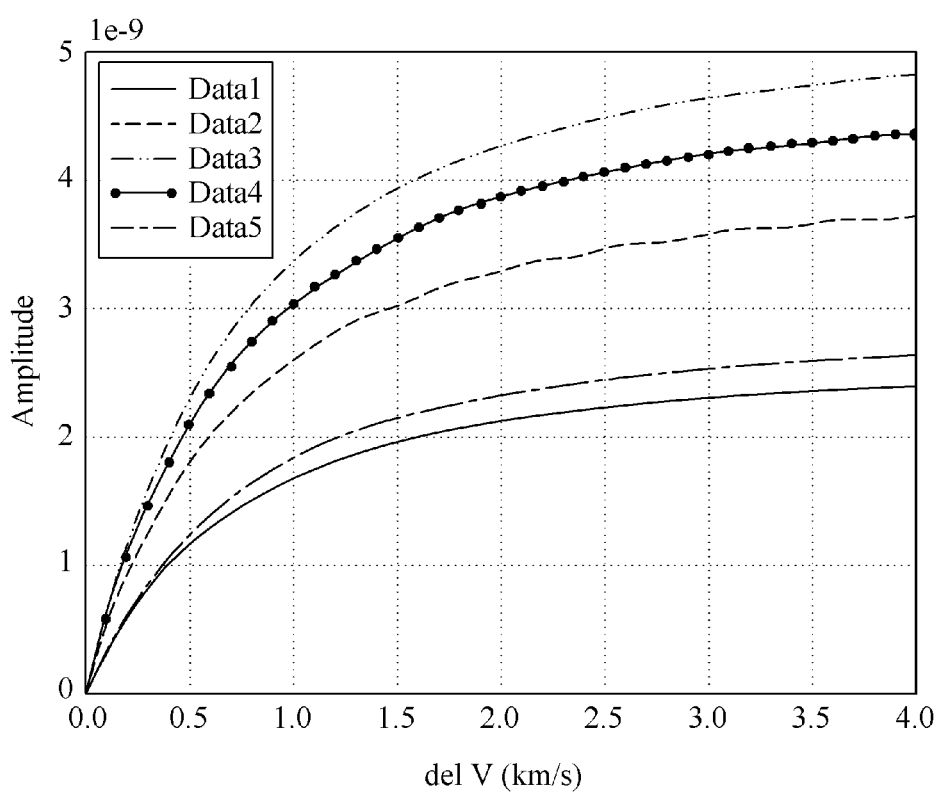
FIGS. 4A and 4B show the result of the test regarding the peak amplitude of the scattered signal versus the perturbed amount of velocity for five scatters with a different source and receiver.
Figure 4B:
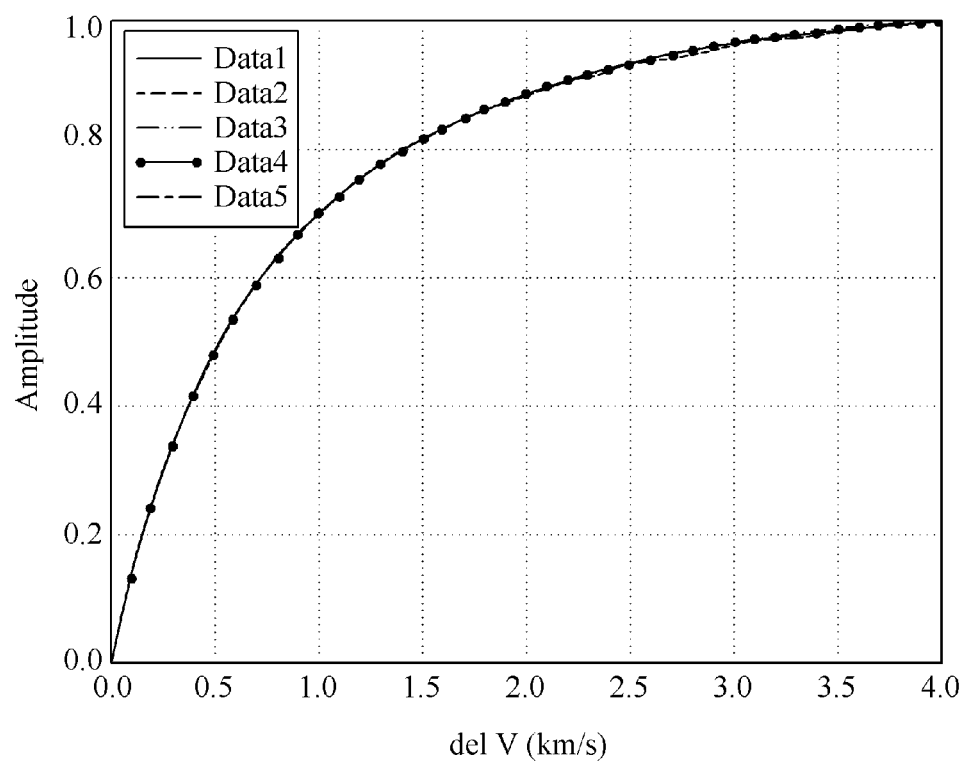

According to an aspect of the present invention, calculation of the velocity difference function includes calculating the velocity difference function using a relationship between the relative velocity anomalies ratio and the velocity difference function as shown in step S40 in FIG. 1. The velocity anomaly ratio, $\Delta v(x)$, can be calculated using $r(x) = R[\Delta v(x)]^2$ and the graph shown in FIG. 4B. The computed anomaly r(x) shows where the high-velocity structure is. However, the result may be very smooth and have a wide spread. The position of the maximum value in result may be an accurate position of the structure, but the surrounding region that contains high-velocity structures might also have large values. By inspection, it is believed that it is more suitable to curtail the range of the result with a scaling method.

According to an aspect of the present invention, seismic imaging method may include normalizing the velocity difference function after the calculating of the velocity difference function (step S50 in FIG. 1). The size of anomalous bodies can be controlled with the following scheme:

$$\Delta v_{after} = N|(\Delta v_{before})^q| \quad (18)$$

where $N|\bullet|$ is the normalized value of $\bullet$, and q is a scaling constant. As the value of q becomes larger, the size of the anomalous bodies becomes smaller. In this embodiment, q=2 is used. From this procedure, more reasonable results for velocity updating can be obtained. According to an aspect of the present invention, calculation of the velocity difference function includes calculating the velocity difference function using a relationship between the relative velocity anomalies ratio and the velocity difference function. In the present embodiment, the velocity model is computed by updating the initial velocity with a scaled anomaly as follows.

$$v_r(x) = v_0(x) + \gamma \Delta v(x) \quad (19)$$

where $v_R(x)$ is the computed velocity by our algorithm, $v_0(x)$ is the initial velocity, and $\gamma$ is a step length for the update. To determine a proper q and $\gamma$, several line searches are performed that calculated the error between the seismograms obtained using the actual and computed velocity models.

Figure 2:
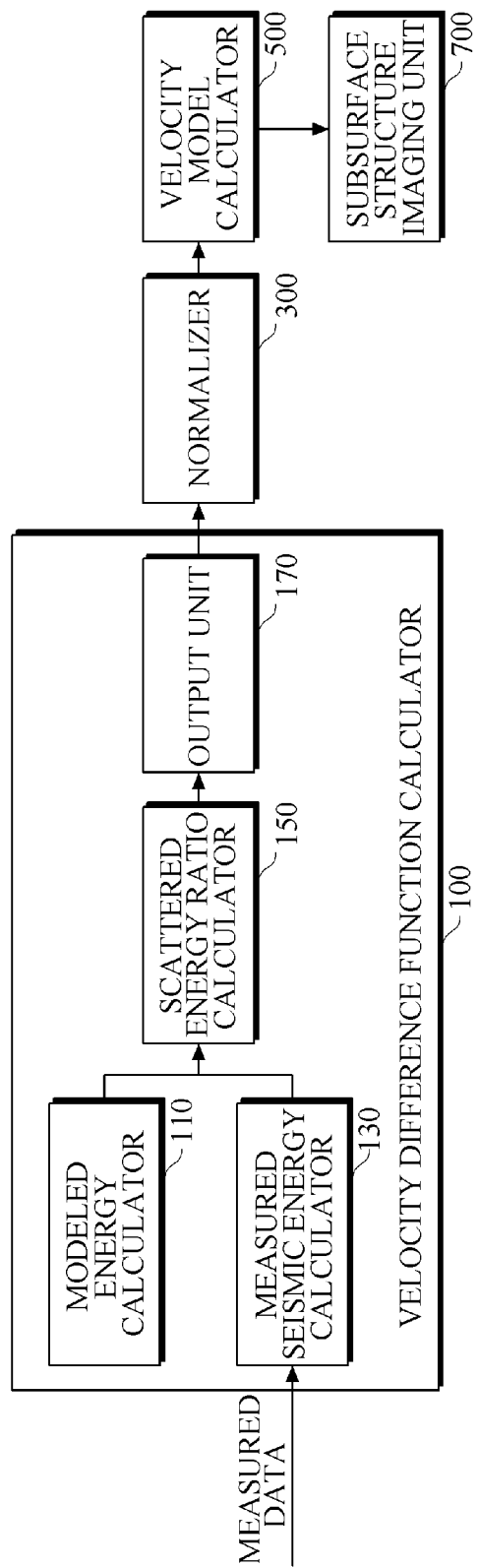
FIG. 2 is a schematic block diagram illustrating an example of a seismic imaging apparatus.

FIG. 2 is a schematic block diagram illustrating an example of a seismic imaging apparatus. As shown in FIG. 2, the seismic imaging apparatus includes a velocity difference function calculator 100, a normalizer 300, and a subsurface structure imaging unit 700. The velocity difference function calculator 100 calculates a velocity difference function which is a difference between a real velocity and an initial velocity model, wherein the velocity difference function is a ratio of measured seismic scattered energy and modeled scattered energy based on the initial velocity model. The velocity model calculator 500 updates the initial velocity model with the velocity difference function to thereby calculate a macro-velocity model. The subsurface imaging unit 700 calculates imaging data of a subsurface structure through waveform inversion based on the macro-velocity model. The subsurface imaging unit 700 calculates modeling parameters such as the density, velocity of the subsurface space to which a source wave is propagated. The modeling parameters of the wave equation are calculated by waveform inversion. According to the waveform inversion, the modeling parameters are calculated while being continuously updated in the direction of minimizing a residual function regarding the difference between modeling data and measured data, wherein the modeling data is a solution of the wave equation.

According to another aspect of the present invention, the velocity function calculator includes a measured seismic energy calculator 130 configured to approximate measured seismic signals to a sum of scattered waves to obtain the measured seismic scattered energy. As previously described, the measured seismic energy calculator 130 calculates the measured seismic energy based on the equation (11). Also, a modeled energy calculator 110 calculates energy of pseudo-scattered signals from a simple velocity model, such as linearly increasing velocity model. The modeled energy calculator 110 calculates energy of pseudo-scattered signals, which is the K matrix in left term of equation (16) with the analytic solution in equation (7). Then, a scattered energy ratio calculator 150 calculates a relative velocity anomalies ratio which is a ratio of a value of the measured seismic scattered energy and a value of the energy of pseudo-scattered signals based on equation (17). Then, an output unit 170 calculates the velocity difference function using a relationship between the relative velocity anomalies ratio and the velocity difference function illustrated in FIG. 4A.

According to another aspect of the present invention, the seismic imaging apparatus may include a normalizer 300 configured to normalize the velocity difference function calculated by the velocity difference function calculator 100 and to output the normalized velocity difference model to the velocity model calculator 500. The normalizer 300 normalizes the velocity difference function based on the equation (18).

Therefore, it is possible to calculate a macro-velocity model through computation by analytical solution without iterative calculation. Also, waveform inversion by the macro-velocity model can increase the convergence speed of iteration loop and enhance the resolution of deep region in the reconstructed image The processes, functions, methods and/or software described above may be recorded, stored, or fixed in one or more computer-readable storage media that includes program instructions to be implemented by a computer to cause a processor to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of computer-readable media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules in order to perform the operations and methods described above, or vice versa. In addition, a computer-readable storage medium may be distributed among computer systems connected through a network and computer-readable codes or program instructions may be stored and executed in a decentralized manner.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A seismic imaging method implemented by a program executed on a computing apparatus, for obtaining imaging data of a subsurface structure through waveform inversion using a macro-velocity model as an initial value, wherein the macro-velocity model which is used as the initial value for the waveform inversion is calculated by:
   calculating a velocity difference function which is a difference between a real velocity and an initial velocity model, wherein the velocity difference function is a ratio of measured seismic scattered energy and modeled scattered energy based on the initial velocity model; and calculating the macro-velocity model by updating the initial velocity model with the velocity difference function, wherein the calculating of the velocity difference function comprises:

approximating measured seismic signals from a plurality of receivers to a sum of scattered waves to calculate the measured seismic scattered energy;

calculating energy of pseudo-scattered signals from a simple velocity model;

calculating a relative velocity anomalies ratio which is a ratio of a value of the measured seismic scattered energy and a value of the energy of pseudo-scattered signals;

calculating the velocity difference function using a relationship between the relative velocity anomalies ratio and the velocity difference function;

obtaining the imaging data of the subsurface structure based on the macro-velocity model using a subsurface imaging unit; and recording, storing, or fixing the imaging data and/or subsurface velocity data in a computer-readable storage media.

2. The seismic imaging method of claim 1, after the calculating of the velocity difference function, further comprising normalizing the velocity difference function.

3. A seismic imaging apparatus implemented by a program and a computing apparatus, the seismic imaging apparatus comprising:

a velocity difference function calculator configured to calculate a velocity difference function which is a difference between a real velocity and an initial velocity model, wherein the velocity difference function is a ratio of measured seismic scattered energy and modeled scattered energy based on the initial velocity model;

a velocity model calculator configured to update the initial velocity model with the velocity difference function to thereby calculate a macro-velocity model; and a subsurface imaging unit configured to calculate imaging data of a subsurface structure through waveform inversion based on the macro-velocity model, wherein the velocity difference function calculator comprises:

a measured seismic energy calculator configured to approximate measured seismic signals from a plurality of receivers to a sum of scattered waves to obtain the measured seismic scattered energy;

a modeled energy calculator configured to calculate energy of pseudo-scattered signals from a simple velocity model;

a scattered energy ratio calculator configured to calculate a relative velocity anomalies ratio which is a ratio of a value of the measured seismic scattered energy and a value of the energy of pseudo-scattered signals; and an output unit configured to calculate the velocity difference function using a relationship between the relative velocity anomalies ratio and the velocity difference function; and a computer-readable storage media that records, stores, or fixes the imaging data and/or subsurface velocity data.

4. The seismic imaging apparatus of claim 3, further comprising a normalizer configured to normalize the velocity difference function calculated by the velocity difference function calculator and to output the normalized velocity difference model to the velocity model calculator.

* * * * *